May 9, 1933. C. T. PFLUEGER 1,908,537
ARTIFICIAL FISH BAIT
Filed Feb. 6, 1930

INVENTOR
CHARLES T. PFLUEGER
BY
ATTORNEYS

Patented May 9, 1933

1,908,537

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

ARTIFICIAL FISH BAIT

Application filed February 6, 1930. Serial No. 426,245.

One purpose or object of the invention is to provide an improved bait or lure which includes a reinforced body preferably of molded material such as vulcanized rubber, the reinforcement extending through the body and having means at its opposite ends for attaching the line and hooks, the reinforcement preferably being arranged to function as a keel to hold the bait body in proper relation in the water.

A further object of the invention is to provide, associated with said reinforcement, a plane tending to depress the bait in the water when the bait is traveling, said plane preferably being of transparent material such as celluloid.

A further object of the invention is to provide a bait, such as an artificial shrimp, with feelers in a simple, effective manner.

A further object is to provide an effective arrangement of eyes on such bait.

The foregoing objects of the invention are attained in the artificial shrimp bait shown in the accompanying drawing and described below. It is to be understood that changes or modifications of the invention are contemplated in adapting the features thereof to various baits and that accordingly the invention is not limited to the specific form of bait illustrated and described.

Of the accompanying drawing.

Figure 1:
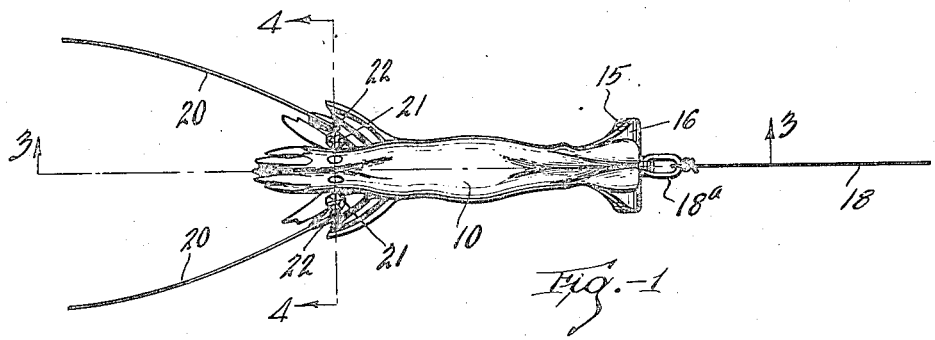
Figure 1 is a plan of the improved bait.
Figure 2:
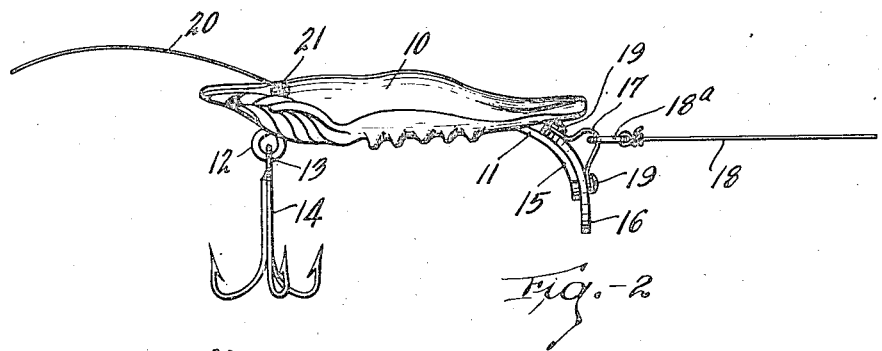
Figure 2 is a side elevation thereof.
Figure 3:
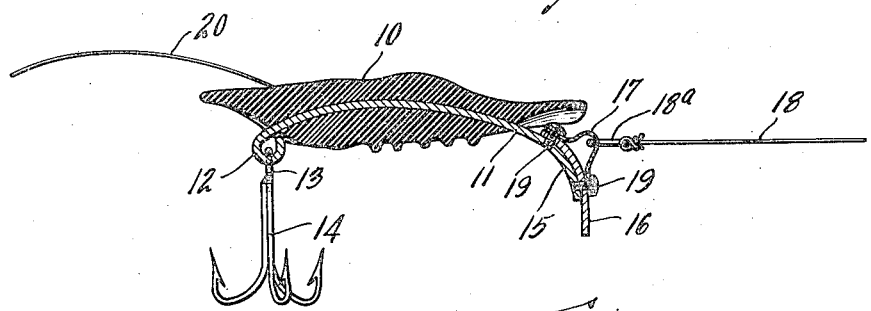
Figure 3 is a central longitudinal section through the bait.
Figure 4:
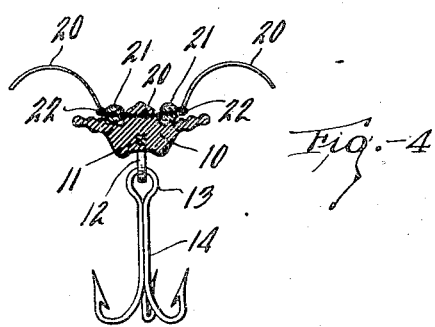
Figure 4 is a section on line 4—4 of Figure 1.

Referring to the drawing, the numeral 10 designates the bait body which may be of molded, vulcanized rubber to simulate any desired form of bait such as a shrimp. The bait body 10 is provided with a reinforcement 11 consisting of a strip of metal secured in the bait body either in the course of manufacture, as by vulcanization of the body about the reinforcement, or by inserting in the body after vulcanization. The reinforcement is bent in an arc and is preferably arranged with the ends thereof projecting below the bait body. One end of the reinforcement 11 may be provided with a loop 12 in which the eye 13 of a hook device 14 comprising one or more hooks may be engaged. The other end of the reinforcing strip 11 may be enlarged and downwardly bent as at 15 to provide a suitable support for a diving plane 16 preferably of transparent material such as celluloid and also for a loop 17 by which the bait may be connected to a line 18, a line attaching eye 18ª being shown engaged in loop 17 for this purpose.

The plane 16 and loop 17 may be removably secured to portion 15 of the reinforcement as by screws or rivets 19, 19 extending through the ends of the loop 17 and the plane 16 into the portion 15.

The form and arrangement of the reinforcing strip 11 in the bait body 10 is such that the bait body is held in the manner of a live bait swimming as the bait moves through the water, the distribution of the weight of the strip with relation to the bait body causing it to act as a keel and the plane 15 and 16 tending to depress the bait to move through the water at a depth depending upon the speed at which the bait is drawn. The plane may be either a diving or elevating plane, depending upon the action desired, and the plane may be a separate piece as shown or may be an integral part of the metal strip. The plane may be of any desirable color to add to the attractiveness of the bait.

The bait may be provided with feelers and eyes by incorporating in the bait body a strip or thread of comparatively stiff, flexible material such as water-proofed thread or cord 20, the end portions of which provide feelers, beads 21, 21 being slipped onto said feeler portions and secured thereon adjacent the bait body as by knotting the feeler portions of the thread as at 22, 22. The knots or formations not only hold the eyes in place but prevent shifting of the feeler. The combination of the diving plane and the location of the reinforcement causes the bait body to have a very life-like movement in the water, wiggling in sharp undulations and simulating the action of a live bait of this type.

The improved bait has a very life-like appearance. It is inexpensive to manufacture and is highly effective in use. As the hook and the line attachment are both carried upon the metal reinforcement there is no strain upon the body, which surrounds the plate. The beads which constitute the eyes are securely held against the body and the parts are easily assembled by the improved means of attachment. It is obvious that modifications of the invention may be resorted to without departing from the spirit thereof or the scope of the appended claims.

What is claimed is:

1. An artificial fish bait comprising a bait body of vulcanized rubber and a reinforcement therein comprising a bow-shaped strip of metal, the ends of which project beneath the bait body, one end being provided with means for attaching a hook and the other end being provided with a diving plane, and means for connecting a line to said end, said bait body having the central portion of a thread of flexible, water-proof material embedded therein to provide feelers and beads to simulate eyes on said feelers adjacent the bait body and retained thereon by knots in the feelers.

2. An artificial fish bait comprising a bait body of vulcanized rubber and a reinforcement therein comprising a strip of metal, the ends of which project at opposite ends of the bait body, one end being provided with means for attaching a hook and the other end being provided with a plane, and means for connecting a line to said end, said bait body having the central portion of a thread of flexible, waterproof material embedded therein to provide feelers and beads to simulate eyes on said feelers adjacent the bait body and retained thereon by knots in the feelers.

3. An artificial fish bait comprising a bait body of vulcanized rubber and a reinforcement therein comprising a strip of metal, the ends of which project at opposite ends of the bait body, one end being provided with means for attaching a hook and the other end being provided with means for connecting a line, said bait body having the central portion of a thread of flexible, waterproof material embedded therein to provide feelers and beads to simulate eyes on said feelers adjacent the bait body and retained thereon by knots in the feelers.

4. An artificial fish bait comprising a bait body of vulcanized rubber and a reinforcement therein comprising a strip of metal, the ends of which project from the bait body, one end being provided with means for suspending a hook and the other end being provided with means for connecting a line, said bait body having the central portion of a thread of flexible, waterproof material embedded therein to provide feelers and beads to simulate eyes on said feelers adjacent the bait body.

5. An artificial fish bait comprising a bait body of vulcanized rubber and a reinforcement therein comprising a bow-shaped strip of metal, the ends of which project beneath the bait body, one end being provided with means for attaching a hook and the other end being provided with a diving plane, and means for connecting a line to the reinforcement.

6. An artificial fish bait comprising a bait body of vulcanized rubber and a reinforcement comprising a bow-shaped strip of metal, the ends of which project beneath the bait body, one end being provided with means for attaching a hook device and the other end being provided with means for connecting a line to said end.

7. An artificial fish bait comprising a molded body and a reinforcement embedded therein comprising a bow-shape strip of metal, the ends of which project beneath the bait body, one end having a hook device secured thereto and the other end being adapted for connecting a line to the bait.

8. An artificial bait comprising a body, a thread-like feeler extending through the body, and means in the feelers which prevent shifting of the feelers in the body.

9. An artificial fish bait comprising a molded bait body and a feeler provided by a flexible element, a portion of said flexible element being embedded in the bait body to secure the feeler to the body, and eyes carried upon the feeler at either side of the body.

10. An artificial fish bait comprising a molded bait body and a feeler provided by a flexible element, a portion of said flexible element being embedded in the bait body to secure the feeler to the body, eyes carried upon the feeler and formations on the feelers securing the eyes against the body.

CHARLES T. PFLUEGER.